United States Patent
Schultz et al.

(10) Patent No.: US 6,788,273 B1
(45) Date of Patent: Sep. 7, 2004

(54) RADOME COMPENSATION USING MATCHED NEGATIVE INDEX OR REFRACTION MATERIALS

(75) Inventors: Stephen M. Schultz, Spanish Fork, UT (US); Delmar L. Barker, Tucson, AZ (US); Harry A. Schmitt, Tucson, AZ (US)

(73) Assignee: Raytheon Company, Waltham, MA (US)

( * ) Notice: Subject to any disclaimer, the term of this patent is extended or adjusted under 35 U.S.C. 154(b) by 0 days.

(21) Appl. No.: 10/246,828

(22) Filed: Sep. 19, 2002

(51) Int. Cl.$^7$ ............................................. H01Q 15/02
(52) U.S. Cl. ..................................... 343/909; 343/872
(58) Field of Search .............................. 343/753, 872, 343/907, 909, 911 L

(56) References Cited

U.S. PATENT DOCUMENTS

| | | | |
|---|---|---|---|
| 5,125,600 | * 6/1992 | Brumbaugh | 244/158 A |
| 5,683,646 | * 11/1997 | Reiling, Jr. | 264/512 |
| 5,689,275 | * 11/1997 | Moore et al. | 343/786 |
| 5,861,860 | * 1/1999 | Stanek et al. | 343/909 |
| 6,473,048 | * 10/2002 | Diaz | 343/753 |

OTHER PUBLICATIONS

D.F. Sievenpiper et al, "3D Metallo–Dielectric Photonic Crystals with Stong Capacitive Coupling between Metallic Islands," *Physical Review Letters*, vol. 80, No. 13, Mar. 30, 1998.

D.F. Sievenpiper et al, "High–Impedance Electromagnetic Surfaces with a Forbidden Frequency Band," *IEEE Transactions on Microwave Theory and Techniques*, vol. 47, No. 11, Nov. 1999.

M. Notomi, "Theory of Light Propagation in Strongly Modulated Photonic Crystals: Refactionlike Behavior in the Vicinity of the Photonic Band Gap," *Physical Review B*, vol. 62, No. 16, Oct. 15, 2000.

D.R. Smith et al, "Composite Medium with Simultaneously Negative Permeability and Permittivity," *Physical Review Letters*, vol. 84, No. 18, May 1, 2000.

D.R. Smith et al, "Negative Refractive Index in Left–Handed Materials," *Physical Review Letters*, vol. 85, No. 14, Oct. 2, 2000.

\* cited by examiner

*Primary Examiner*—Shih-Chao Chen
(74) *Attorney, Agent, or Firm*—Thomas J. Finn; Len Alkov; Phil Berestecki

(57) ABSTRACT

A compensated radome is provided, comprising an inner layer of a negative index of refraction material, often referred to as a "metamaterial", and an outer layer of a positive index of refraction material. The thickness of the two materials and their respective refractive indices are adjusted so that a beam of light passing through the radome is effectively not refracted. The metamaterial-compensated radomes solve the bore sight angle problem with a minimum of complexity.

25 Claims, 2 Drawing Sheets

RADOME COMPENSATION USING MATCHED NEGATIVE INDEX OR REFRACTION MATERIALS

TECHNICAL FIELD

The present invention relates generally to radomes, and, more particularly, to compensated radomes for eliminating bore sight errors produced by refraction of the radome.

BACKGROUND ART

Optically-transparent radomes suffer from refraction, due to the bending of light through the radome material. It is desired to compensate such radome effects that degrade performance of present-day missile radar seekers. These radome-induced distortions ultimately limit the missile's ability to detect stressing targets in the presence of severe interference. RF adaptive array processing places very stringent requirements on antenna calibration and radome compensation. These requirements will only increase in the future, as inexpensive countermeasures become increasingly sophisticated and widespread.

Compensating bore sight shift is typically accomplished by measuring the radome bore sight shift in a RF chamber and storing compensation coefficients to be used in software algorithms. Compensation coefficient tables are typically a function of RF and gimbal angle, both azimuth and elevation. System requirements drive compensation accuracy, which in turn drives the quantity and quality of data that must be measured and stored for compensation. Heating caused by aerodynamics, radome-to-radome variability, and aging may also have to be considered when compensating. Such compensating methods add to the cost and complexity of radome systems Thus, there is a need for compensated radomes that avoids most, if not all, of the foregoing problems.

DISCLOSURE OF INVENTION

In accordance with the present invention, a compensated radome is provided, comprising an inner layer of a negative index of refraction material, often referred to as a "metamaterial", and an outer layer of a positive index of refraction material. The thickness of the two materials and their respective refractive indices are adjusted so that a beam of light passing through the radome is effectively not refracted.

The metamaterial-compensated radomes of the present invention solve the bore sight angle problem with a minimum of complexity.

BRIEF DESCRIPTION OF THE DRAWINGS

FIG. 1 is an elevational view of a missile with an attached dome, while

FIG. 1 depicts a vehicle, here illustrated as a missile 12, having a radome 10 attached thereto. The radome 10 is forwardly facing as the missile flies and is therefore provided with a generally ogival shape that achieves a compromise between good aerodynamic properties and good radiation transmission properties. The missile 12 has a missile body 26 with a forward end 28, a rearward end 30, and a body axis 32. The missile body 26 is generally cylindrical, but it need not be perfectly so. Movable control fins 34 and an engine 36 (a rearward portion of which is visible in FIG. 1a) are supported on the missile body 26. Inside the body of the missile are additional components that are not visible in FIG. 1, that are well-known in the art, and whose detailed construction are not pertinent to the present invention, including, for example, a guidance controller, motors for moving the control fins, a warhead, and a supply of fuel.

BEST MODES FOR CARRYING OUT THE INVENTION

Figure 1:
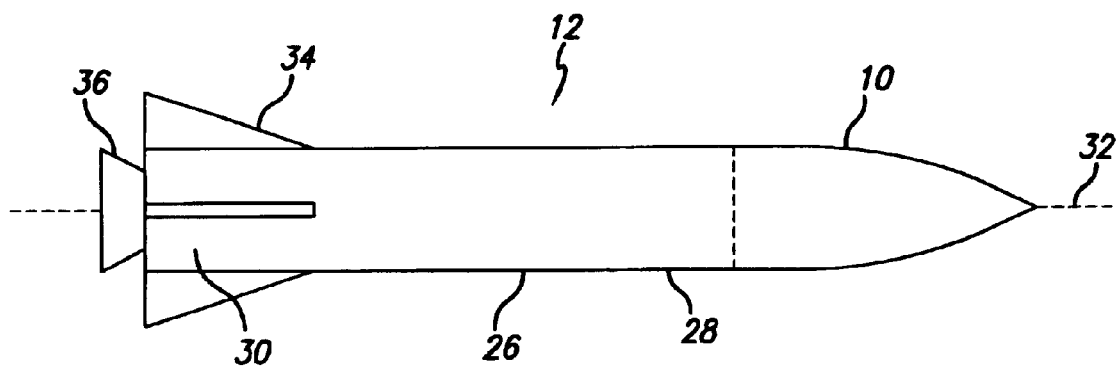
Figure 1A:
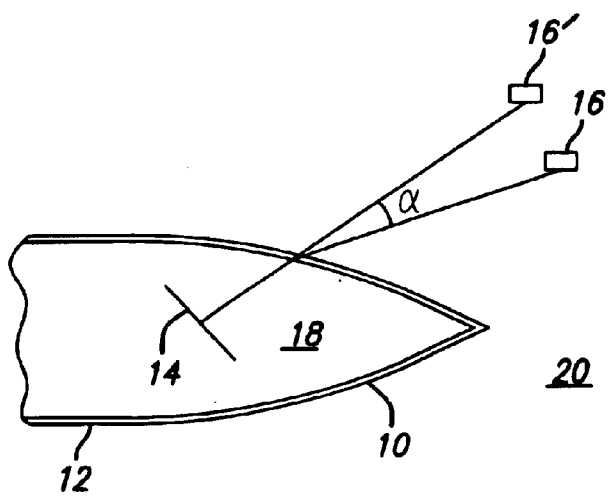
FIG. 1a is an enlargement of a portion of FIG. 1 and is a schematic diagram, depicting the bore sight error caused by refraction with a radome material.

FIG. 1a shows how the presence of a the radome 10, forming the forward portion of a the missile 12 (shown in partial), introduces bore sight errors. A sensor 14 is mounted on a gimbaled mount. The nature of the sensor 14 is immaterial, and may comprise any of the known sensors operating in the visible, IR, or UV portion of the electromagnetic spectrum. Alternatively, the sensor 14 may instead be an antenna or other receiving means for receiving a signal and then conveying the signal to the actual sensor. While a missile with a radome is specifically illustrated, it will be appreciated that the present invention is not limited to missiles per se, but rather is directed to improving radomes, regardless of the craft on which they are used.

The function of the sensor 14 is to sense the location of a target 16. However, the radome 10 comprises an optical material having a finite thickness. Due to the nature of light passing through different materials (the atmosphere 18 inside the radome 10, the transparent radome itself, and the atmosphere 20 outside the radome), light is bent at each interface, as is well-known. As a result, a target 16 that is actually at one location is perceived by the sensor 14 to be at a different, apparent location 16'. The angle α between the two positions 16, 16' relative to the sensor 14 is called the bore sight error.

A variety of compensation mechanisms have been employed, as described above. The present invention provides a compensation approach that uses novel new metamaterials that possess a negative index of refraction, whose magnitude can be matched to that of the radome materials. These metamaterials can be either photonic band gap (PBG) materials or the much more recently discovered left handed materials (LHM). Both PBG materials, fashioned to have a negative index of refraction, and LHMs can be used to compensate for the effects of the radome 10; however, only the LHM are truly left handed in the sense of having simultaneous $-\mu$ and $-\epsilon$.

Examples of PBG materials and LHMs are increasingly well-known. For example, PBG materials are described by D. F. Sievenpiper et al, "3D Metallo-Dielectric Photonic Crystals with Strong Capacitive Coupling between Metallic Islands", *Physical Review Letters*, Vol. 80, No. 13, pp. 2829–2831 (Mar. 30, 1998); D. Sievenpiper et al, "High-Impedance Electromagnetic Surfaces with a Forbidden Frequency Band", *IEEE Transactions on Microwave Theory and Techniques*, Vol. 47, No. 11, pp. 2059–2074 (Nov. 1999); and M. Notomi, "Theory of light propagation in strongly modulated photonic crystals: Refractionlike behavior in the vicinity of the photonic band gap", *Physical Review B*, Vol. 62, No. 16, pp. 10,696–10,705 (Oct. 15, 2000). The contents of the foregoing references are expressly incorporated herein by reference.

Examples of LHMs are described by D. R. Smith et al, "A composite medium with simultaneously negative permeability and permittivity", *Physical Review Letters*, Vol. 84, No. 18, pp. 4184–4187 (May 1, 2000), which discloses demonstration of a composite medium, based on a periodic array of interspaced, conducting, nonmagnetic split ring resonators (SRR) and continuous wires, that exhibits a frequency region in the microwave regime with simultaneously negative values of effective permeability $\mu_{eff}(\omega)$ and permittivity $\epsilon_{eff}(\omega)$. This structure forms a "left-handed" medium (that is, ExH lies along the direction of –k for propagating plane waves), for which it has been predicted that such phenomena as the Doppler effect, Cerenkov radiation, and even Snell's Law are inverted. See also D. R. Smith et al, "Negative Refractive Index in Left-Handed Materials", *Physical Review Letters*, Vol. 85, No. 14, pp. 2933–2936 (Oct. 2, 2000). The contents of the foregoing references are expressly incorporated herein by reference.

The use of metamaterials should also have a number of other benefits. Because the metamaterials solve the problem on the "physical level", they are more likely to be able to provide corrections over larger ranges of RF and gimbal angle, both azimuth and elevation. Moreover, the PBG materials and the LHMs tend to be inherently narrow band. This property means that it should be possible to build into the radome 10 attractive properties, such as cross-section reduction and improved protection against EMI (electromagnetic-interference) and EMP (electro-magnetic pulse). If the materials can be made tunable, and there is considerable evidence that they can be, it should also be possible to incorporate narrow band filtering/frequency agility into the radome 10 itself.

Figure 2:
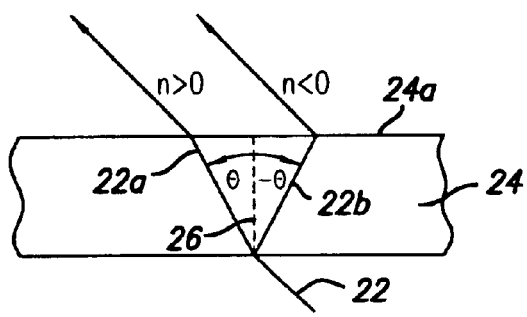
FIG. 2 is a diagram depicting the refraction of an incident ray for negative and positive refractive index material.

Specifically-designed PBG and LHM are composite materials that exhibit the bulk property of a negative index of refraction. The bulk index of refraction results in a sign reversal of Snell's slaw as given by $$n_1 \sin(\theta_1) = -n_2 \sin(\theta_2),$$

where $\theta_1$ and $\theta_2$ are the propagation angles of the electromagnetic waves in the two regions, where region 1 is a conventional media with a positive index of refraction and region 2 exhibits a negative index of refraction. The sign reversal results in the flip of the refracted angle about the surface normal. FIG. 2 shows a ray 22 incident on a slab 24 of high index material. If the slab 24 of material has a positive index of refraction (n>0), then the ray 22a is refracted toward the normal 26 to the surface 24a, with the angle $\theta$ remaining positive (measured counter-clockwise from the surface normal).

However, if the index of refraction has the same magnitude but is negative (n<0), then the refracted ray 22b will still be refracted towards the surface normal 26, with the refracted angle becoming negative (measured clockwise). This results in a flip of the refracted ray about the surface normal 26 as illustrated in FIG. 2.

The result of propagation through a slab of material with a negative index of refraction can be considered as a negative phase advance rather than a positive phase advance exhibited by a slab of material with a positive index of refraction. Both the approach using Snell's slaw and the concept of phase advance result in an equal but opposite response between positive and negative index materials. This equal but opposite response of a material with a negative index of refraction can be used to compensate for refraction caused by traditional bulk material.

Figure 3A:
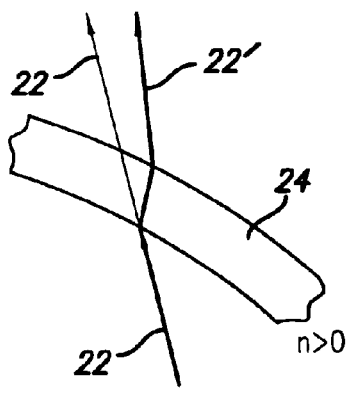
FIGS. 3a–3b depict a schematic diagram of a radome and its refraction for (a) a conventional radome and (b) a compensated radome of the present invention.
Figure 3B:
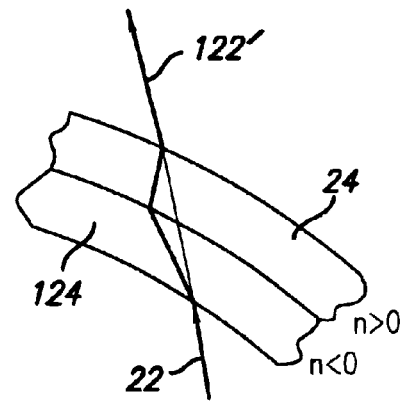

FIGS. 3a–3b illustrate how a slab 124 of negative index material is used to compensate for a slab 24 of positive index material.

Specifically, FIG. 3a shows a ray 22 transmitted through a curved slab 24 of (conventional) positive index material. Examples of such positive index materials commonly employed in radomes include glass, transparent plastics, ceramics, and sapphire, although any material that is heat-resistant, is aerodynamically strong, and can still transmit radar signals may be employed in the practice of the present invention.

After traveling through the slab 24 of material, the ray 22' is traveling in a different direction than the ray 22 would travel without the slab 24 of material present, and thus exhibits the afore-mentioned bore sight error. FIG. 3b shows the same slab 24 of material with an additional layer 124 of material with a negative index of refraction. The material 124 with a negative index of refraction exhibits an equal but opposite response to that of the material 24 with a positive index of refraction. The resulting response is a wave 122' traveling in the same direction as a ray 22 would without any material 24, 124 present. And thus, the material is compensated so as to eliminate the bore sight error. Of course, the material selected for the layer 124 must not only be of opposite sign (negative), but also be substantially equal in absolute value to that of the material comprising layer 24. While slight deviations may be tolerated between the two values, best results are obtained where both materials have essentially the same absolute value of index of refraction.

On the other hand, if there is a mismatch in absolute value of index of refraction, it is possible to alter the thickness of the negative index material to compensate, using well-known equations available in any optics text book. Further, it is possible to alter the shape of either of the surfaces on the negative index material 124, using spheric or aspheric surfaces to form lensing surfaces, as is well-known in optical materials.

In addition to the bore sight error, another deficiency in traditional radomes 10 is the reflection of RF energy off of the radome. The radome reflection causes a substantial increase in side lobes of the radar beam. This increase in the side lobe produces a significant degradation in seeker performance. Requiring the radome to be ½ wavelength thick minimizes the reflection of RF radiation. When the radome is one half wavelengths thick, then the wave that traverses the material undergoes a shift in phase of $\pi$, thereby resulting in zero reflection. However, this can only be maintained for one specific frequency and incident angle.

A material with a negative index of refraction produces a negative phase advance rather than a positive one. A layer of material with a negative index of refraction can be used to produce a negative phase advance that compensates for the positive phase advance produced by a traditional bulk material. Thus, the compensated radome exhibits zero phase advance resulting in zero reflection. Therefore, the compensated radome shown in FIG. 3b also exhibits zero reflection, given that the thickness of the two layers and the magnitude of the index of refraction are equal. This zero phase advance is independent of incident angle. Furthermore, the zero phase advance of the wave is independent of the thickness of the material given that the two layers have an identical thickness. This results in radomes with zero reflections that can be fabricated to have any thickness.

The use of metamaterials to perform radome compensation is novel for a number of reasons. Some of these have been cited already. The use of negative index of refraction materials is novel. In fact, LHMs have only been fabricated within the last year and a definitive measurement of their left handed properties has only been completed in the last few months. While PBG materials have been around for a number of years, those with a negative index of refraction have only recently been demonstrated. To summarize again the novel properties of the present invention:

1. Metamaterial-compensated radomes eliminate the bore sight errors produced by refraction.
2. Metamaterial-compensated radomes eliminate reflections at all incident angles.
3. Metamaterial-compensated radomes eliminate reflection independent of the total thickness of the compensated radome.
4. LHMs are narrow band, so it should be possible to reduce the radar cross-section (RCS) and enhance electro-magnetic interference/electro-magnetic pulse (EMI/EMP) protection.

Industrial Applicability

The use of metamaterial-compensated radomes is expected to find use in missiles and other optical sighting mechanisms.

What is claimed is:

1. A compensated radome, comprising an inner layer of a negative index of refraction material and an outer layer of a positive index of refraction material, wherein each layer has a thickness, with said thickness of each layer and their respective refractive indices adjusted so that a beam of electromagnetic radiation passing through said radome is effectively not refracted, said beam of electromagnetic radiation received by a receiving means.

2. The compensated radome of claim 1 wherein said inner layer has a different thickness than that of said outer layer.

3. The compensated radome of claim 2 wherein said inner layer has a different absolute value of index of refraction than that of said outer layer.

4. The compensated radome of claim 1 wherein said inner layer and said outer layer have an identical thickness.

5. The compensated radome of claim 4 wherein said inner layer and said outer layer each have an identical absolute value of index of refraction.

6. The compensated radome of claim 1 wherein said negative index of refraction material comprises a photonic band gap material.

7. The compensated radome of claim 1 wherein said negative index of refraction material comprises a left handed material.

8. The compensated radome of claim 1 wherein said electromagnetic radiation is selected from the group consisting of UV, visible, and IR wavelengths.

9. The compensated radome of claim 1 wherein said electromagnetic radiation is of RF wavelength.

10. The compensated radome of claim 9 wherein said thickness of said inner layer and said thickness of said outer layer have a total thickness that is one-half wavelength of said RF wavelength.

11. The compensated radome of claim 1 wherein said receiving means comprises a sensor.

12. The compensated radome of claim 1 wherein said receiving means comprises an antenna.

13. A missile including a radome, said radome compensated against bore sight error, said radome comprising an inner layer of a negative index of refraction material and an outer layer of a positive index of refraction material, wherein each layer has a thickness, with said thickness of each layer and their respective refractive indices adjusted so that a beam of electromagnetic radiation passing through said radome is effectively not refracted, said beam of electromagnetic radiation received by a receiving means.

14. The missile of claim 13 wherein said inner layer has a different thickness than that of said outer layer.

15. The missile of claim 14 wherein said inner layer has a different absolute value of index of refraction than that of said outer layer.

16. The missile of claim 13 wherein said inner layer and said outer layer have an identical thickness.

17. The missile of claim 16 wherein said inner layer and said outer layer each have an identical absolute value of index of refraction.

18. The missile of claim 13 wherein said negative index of refraction material comprises a photonic band gap material.

19. The missile of Claim 13 wherein said negative index of refraction material comprises a left handed material.

20. The missile of claim 13 wherein said electromagnetic radiation is selected from the group consisting of UV, visible, and IR wavelengths.

21. The missile of claim 13 wherein said electromagnetic radiation is of RF wavelength.

22. The missile of claim 21 wherein said thickness of said inner layer and said thickness of said outer layer have a total thickness that is one-half wavelength of said RF wavelength.

23. The missile of claim 13 wherein said receiving means comprises a sensor.

24. The missile of claim 13 wherein said receiving means comprises an antenna.

25. A method of compensating for bore sight errors in a radome, said method comprising:
providing a layer of a negative index of refraction material;
providing a layer of a positive index of refraction material; and
fabricating said radome to comprise two layers, an inner layer comprising said layer of negative index of refraction material and an outer layer comprising said layer of positive index of refraction material,
wherein each layer has a thickness, with said thickness of each layer and their respective refractive indices adjusted so that a beam of electromagnetic radiation passing through said radome is effectively not refracted, said beam of electromagnetic radiation received by a receiving means.

* * * * *